(12) United States Patent
Roberge

(10) Patent No.: US 10,197,008 B2
(45) Date of Patent: Feb. 5, 2019

(54) GAS TURBINE ENGINE INCLUDING A THIRD FLOWPATH EXHAUST NOZZLE

(71) Applicant: United Technologies Corporation, Hartford, CT (US)

(72) Inventor: Gary D. Roberge, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 546 days.

(21) Appl. No.: 14/768,714

(22) PCT Filed: Feb. 14, 2014

(86) PCT No.: PCT/US2014/016509
§ 371 (c)(1),
(2) Date: Aug. 18, 2015

(87) PCT Pub. No.: WO2014/130361
PCT Pub. Date: Aug. 28, 2014

(65) Prior Publication Data
US 2016/0003187 A1    Jan. 7, 2016

Related U.S. Application Data

(60) Provisional application No. 61/766,491, filed on Feb. 19, 2013.

(51) Int. Cl.
*F02K 3/077* (2006.01)
*F02K 1/12* (2006.01)
(Continued)

(52) U.S. Cl.
CPC ............ *F02K 1/1207* (2013.01); *F02K 1/008* (2013.01); *F02K 1/1292* (2013.01); *F02K 1/38* (2013.01);
(Continued)

(58) Field of Classification Search
CPC ............ F02K 3/077; F02K 3/075; F02K 3/02
See application file for complete search history.

(56) References Cited

U.S. PATENT DOCUMENTS 4,064,692 A    12/1977   Johnson et al.
5,182,905 A    2/1993    Stransky et al.
(Continued)

OTHER PUBLICATIONS

EP search report for EP14754377.1 dated Feb. 23, 2016.

*Primary Examiner* — Gerald L Sung
(74) *Attorney, Agent, or Firm* — O'Shea Getz P.C.

(57) ABSTRACT

A turbofan engine that includes a first flowpath, a second flowpath, a third flowpath, and a third flowpath exhaust nozzle is provided. The first flowpath is radially inboard of the second flowpath at a location upstream of a core section of the turbofan engine. The third flowpath is radially outboard of the second flowpath at the location upstream of the core section. The third flowpath exhaust nozzle defines a plurality of third flowpath exhaust exit ports through which gas traveling along the third flowpath may be discharged. An area or a geometry of each of the plurality of third flowpath exhaust exit ports is independently and selectively adjustable. A method for operating the turbofan engine includes independently and selectively adjusting an area or a geometry of at least one of the plurality of third flowpath exhaust exit ports to achieve a desired engine operation.

14 Claims, 8 Drawing Sheets

(51) Int. Cl.
*F02K 3/02* (2006.01)
*F02K 1/38* (2006.01)
*F02K 3/075* (2006.01)
*F02K 1/00* (2006.01)

(52) U.S. Cl.
CPC ............... *F02K 3/02* (2013.01); *F02K 3/075* (2013.01); *F02K 3/077* (2013.01); *F05D 2240/128* (2013.01); *F05D 2250/36* (2013.01)

(56) References Cited

U.S. PATENT DOCUMENTS

| | | | |
|---|---|---|---|
| 5,404,713 A * | 4/1995 | Johnson | F02K 1/825 60/204 |
| 5,706,650 A | 1/1998 | Thayer | |
| 7,246,484 B2 | 7/2007 | Giffin, III et al. | |
| 2005/0047942 A1* | 3/2005 | Grffin, III | F02K 3/072 417/423.1 |
| 2005/0109012 A1* | 5/2005 | Johnson | F02K 3/065 60/226.1 |
| 2005/0210860 A1 | 9/2005 | Gutmark et al. | |
| 2006/0096272 A1 | 5/2006 | Baughman et al. | |
| 2007/0186535 A1* | 8/2007 | Powell | F02K 1/08 60/226.1 |
| 2010/0162682 A1 | 7/2010 | Lerg | |
| 2010/0170220 A1 | 7/2010 | Kohlenberg | |
| 2012/0144843 A1 | 6/2012 | Donovan et al. | |

* cited by examiner

GAS TURBINE ENGINE INCLUDING A THIRD FLOWPATH EXHAUST NOZZLE

This application claims priority to PCT Patent Appln. No. PCT/US14/16509 filed Feb. 14, 2014, which claims priority to U.S. Patent Appln. No. 61/766,491 filed Feb. 19, 2013.

BACKGROUND

1. Technical Field

Aspects of the present invention generally relate to turbofan engines, and more particularly relate to turbofan engines that include a third flowpath exhaust nozzle.

2. Background Information

Some turbofan engines include a third flowpath (e.g., a secondary bypass flowpath) and a third flowpath exhaust nozzle that defines a third flowpath exhaust exit port through which gas traveling along the third flowpath may be discharged. In some embodiments, the third flowpath exhaust exit port extends circumferentially about a centerline of the engine. It would be desirable to provide a turbofan engine that includes a third flowpath exhaust nozzle that defines a plurality of third flowpath exhaust exit ports that are independently and selectively adjustable. By independently and selectively adjusting the plurality of third flowpath exhaust exit ports, it may be possible to achieve a desired engine operation that may otherwise be difficult or impossible to achieve. Aspects of the present invention are directed to these and other problems.

SUMMARY

According to an aspect of the present invention, a turbofan engine that includes a first flowpath, a second flowpath, a third flowpath, and a third flowpath exhaust nozzle is provided. The first flowpath is radially inboard of the second flowpath at a location upstream of a core section of the turbofan engine. The third flowpath is radially outboard of the second flowpath at the location upstream of the core section of the turbofan engine. The third flowpath exhaust nozzle defines a plurality of third flowpath exhaust exit ports through which gas traveling along the third flowpath may be discharged. The third flowpath exhaust nozzle is configured so that an area or a geometry of each of the plurality of third flowpath exhaust exit ports is independently and selectively adjustable.

According to another aspect of the present invention, an exhaust section of a turbofan engine that includes a third flowpath exhaust nozzle is provided. The third flowpath exhaust nozzle defines a plurality of third flowpath exhaust exit ports through which gas traveling along a third flowpath of the turbofan engine may be discharged. The third flowpath exhaust nozzle is configured so that an area or a geometry of each of the plurality of third flowpath exhaust exit ports is independently and selectively adjustable.

According to another aspect of the present invention, a method for operating a turbofan engine having a third flowpath exhaust nozzle is provided. The third flowpath exhaust nozzle defines a plurality of third flowpath exhaust exit ports through which gas traveling along a third flowpath of the turbofan engine may be discharged. The third flowpath exhaust nozzle is configured so that an area or a geometry of each of the plurality of third flowpath exhaust exit ports is independently and selectively adjustable. The method includes the step of independently and selectively adjusting an area or a geometry of at least one of the plurality of third flowpath exhaust exit ports to achieve a desired engine operation.

These and other features and advantages of the present invention will become apparent in light of the drawings and detailed description of the present invention provided below.

DETAILED DESCRIPTION

Figure 1:
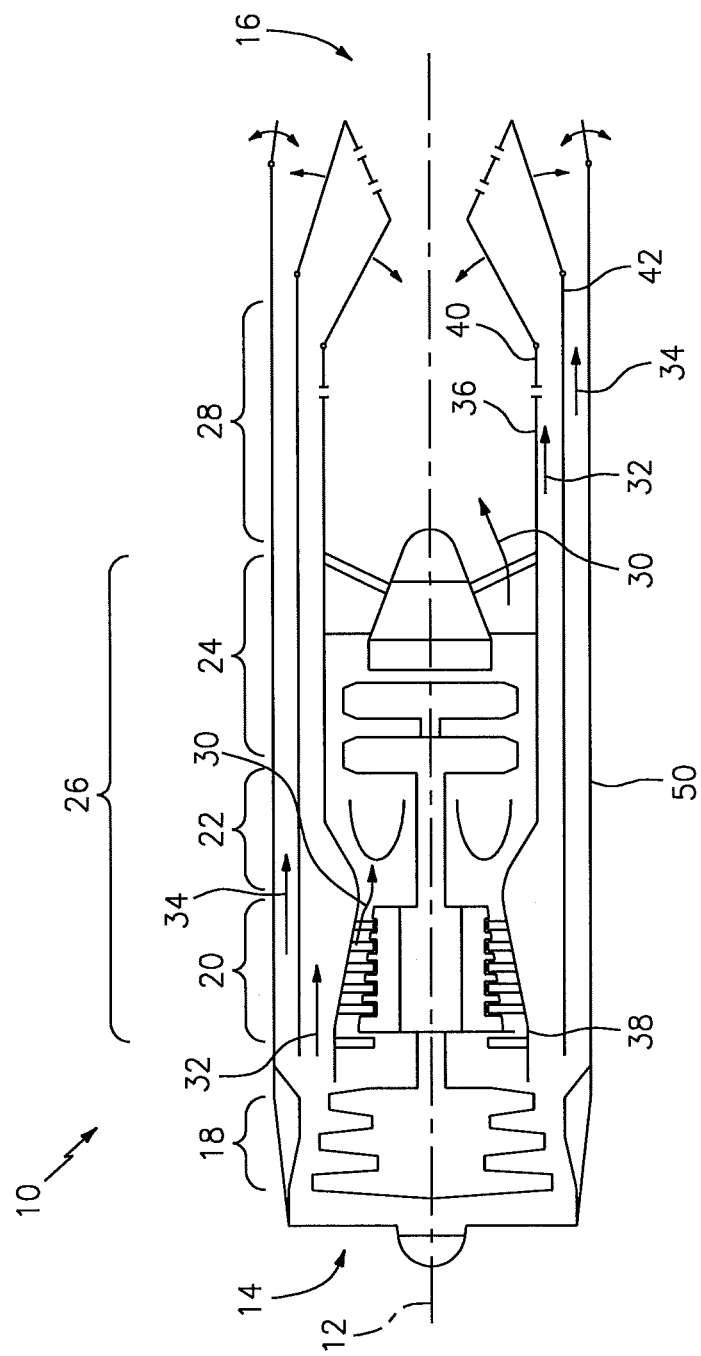
FIG. 1 is a sectional side illustration of a turbofan engine.
Figure 6:
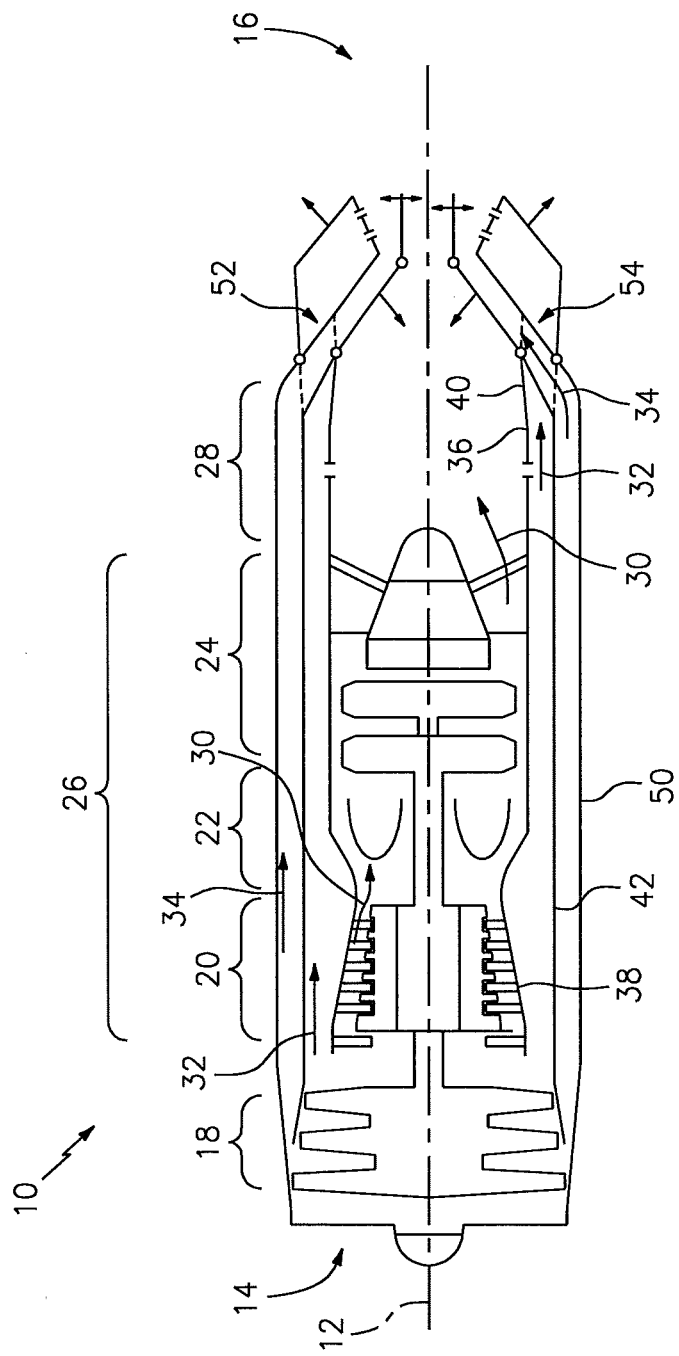
FIG. 6 is a sectional side illustration of another turbofan engine.

The present disclosure describes embodiments of a turbofan engine 10, and components and systems thereof. Referring to the embodiments illustrated in FIGS. 1 and 6, the engine 10 extends along an axial centerline 12 between an upstream inlet section 14 and a downstream exhaust section 16. The engine 10 includes a fan section 18, a compressor section 20, a combustor section 22, and a turbine section 24. The compressor section 20, the combustor section 22, and one or more stages of the turbine section 24 form a core section 26 of the engine 10. In some embodiments, including the embodiments illustrated in FIGS. 1 and 6, the engine 10 additionally includes an augmentor section 28. Aspects of the present invention are not limited to use with the engine 10 embodiments illustrated in FIGS. 1 and 6. For example, although the engine 10 embodiments in FIGS. 1 and 6 are depicted as being augmented low-bypass turbofan engines, aspects of the present invention may also be applied to other types of turbofan engines, including non-augmented turbofan engines, high-bypass turbofan engines, etc.

The engine 10 also includes a first flowpath 30 (e.g., a core flowpath), a second flowpath 32 (e.g., a primary bypass flowpath), and a third flowpath 34 (e.g., a secondary bypass flowpath). The flowpaths 30, 32, 34 extend generally axially in a direction between the inlet section 14 and the exhaust section 16. The engine 10 is configured so that, at a location upstream of the core section 26, the second flowpath 32 is radially outboard of the first flowpath 30, and the third flowpath 34 is radially outboard of the second flowpath 32. In some embodiments, including the embodiment illustrated in FIG. 6, the engine 10 may be configured so that, at a location downstream of the core section 26, the third flowpath 34 is radially inboard of the second flowpath 32.

Figure 2:
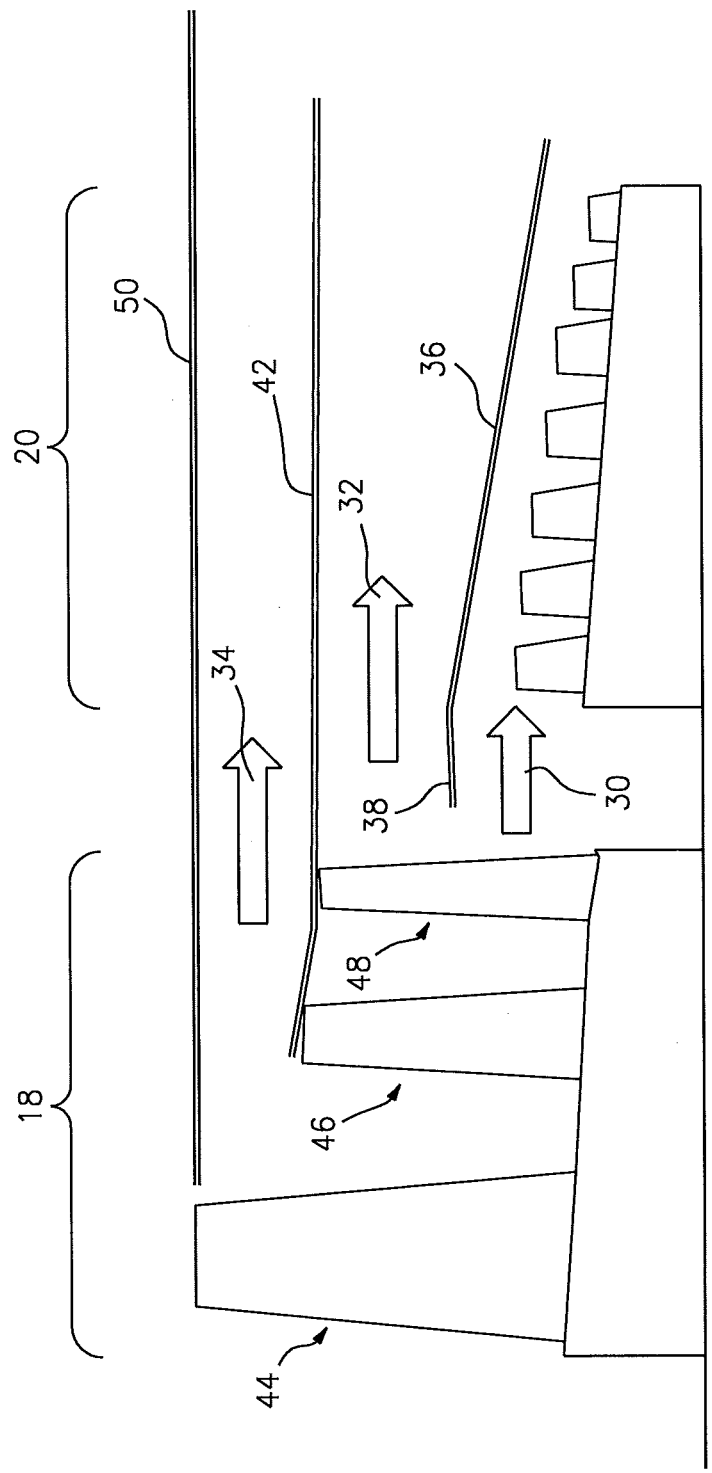
FIG. 2 is a sectional side illustration of the fan section and the compressor section of the turbofan engine of FIG. 1.
Figure 3:
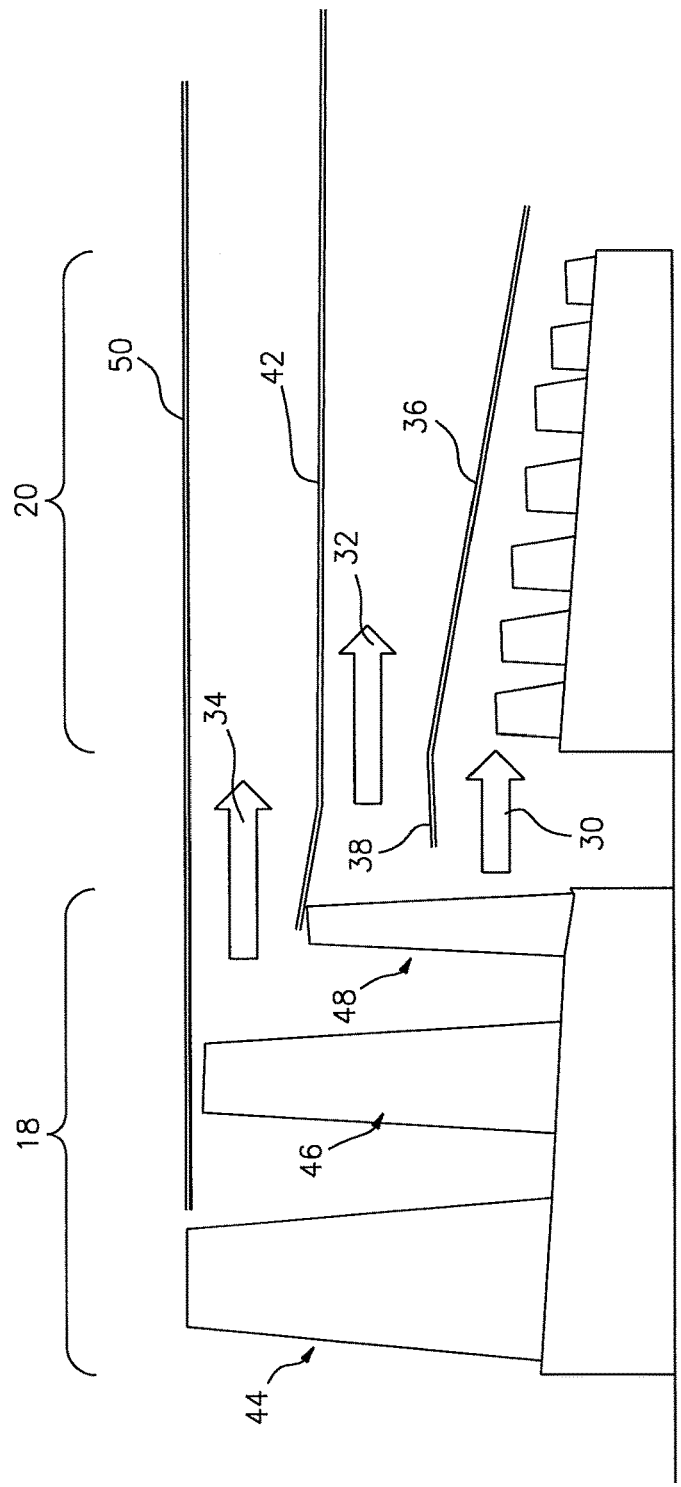
FIG. 3 is a sectional side illustration of the fan section and the compressor section of another turbofan engine.

The flowpaths 30, 32, 34 are defined by components of the engine 10. In the embodiments illustrated in FIGS. 1 and 6, for example, the first flowpath 30 is partially defined by a first engine case 36 that houses the core section 26 and the augmentor section 28. The first engine case 36 includes an upstream end 38 and a downstream end 40. The upstream end 38 of the first engine case 36 is located downstream of the fan section 18. The second flowpath 32 is partially defined by the first engine case 36 and a second engine case 42 that extends circumferentially around the first engine case 36. In some embodiments, the second engine case 42 may extend circumferentially around a stage of the fan section 18. In the embodiments illustrated in FIGS. 2 and 3, for example, the fan section 18 includes an upstream stage 44, an intermediate stage 46, and a downstream stage 48. In the embodiment illustrated in FIG. 2, the second engine case 42 extends circumferentially around the intermediate stage 46 and the downstream stage 48 of the fan section 18. In the embodiment illustrated in FIG. 3, the second engine case 42 extends circumferentially around the downstream stage 48 of the fan section 18. The third flow path 34 is partially defined by the second engine case 42 and a third engine case 50 that extends circumferentially around the second engine case 42. In the embodiments illustrated in FIGS. 2 and 3, the third engine case 50 extends circumferentially around all three stages 44, 46, 48 of the fan section 18. In some embodiments, the flowpaths 30, 32, 34 may be partially defined by an engine duct. In the embodiment illustrated in FIG. 6, for example, the engine 10 includes a plurality of engine ducts 52, 54 that direct the third flowpath 34 radially inboard so that, at a location downstream of the core section 26, the third flowpath 34 is radially inboard of the second flowpath 32. The engine ducts 52, 54 may be rigid or flexible. As shown for example in FIG. 7, the engine ducts 52, 54 fluidly separate the third flowpath 34 from the second flowpath 32 where the third flowpath 34 passes there through. In some alternative embodiments, the engine may include engine ducts 52, 54 that direct the second flowpath 32 radially outboard so that, at a location downstream of the core section 26, the second flowpath 32 is radially outboard of the third flowpath 34. In some embodiments, the engine 10 may include a plurality apertures 55 disposed fluidly between at least two of the flowpaths 30, 32, 34. The apertures 55 may permit gas traveling along one of the flowpaths 30, 32, 34 to flow to another of the flowpaths 30, 32, 34; e.g., for cooling purposes, or other purposes. In the embodiments illustrated in FIGS. 1 and 6, for example, the first engine case 36 includes a plurality of apertures 55 that permit gas traveling along the second flowpath 32 to flow to the first flowpath 30. This feature is shown, for example, in FIGS. 4 and 7. In some embodiments, the engine 10 may include a valve (not shown) disposed fluidly between at least two of the flowpaths 30, 32, 34. The valve may be selectively actuatable between an open position and a closed position (e.g., by a controller) to control the delivery of gas traveling along one of the flowpaths 30, 32, 34 to another of the flowpaths 30, 32, 34. In some embodiments, the engine 10 may include a conduit (not shown) that is in fluid communication with the third flowpath 34. The conduit may be configured to deliver gas from an external source (e.g., an aircraft bay ventilation system) to the third flowpath 34. The flowpaths 30, 32, 34 are not limited to the configurations shown in the drawings and described herein. In other embodiments, the flowpaths 30, 32, 34 may have other configurations; e.g., the flowpaths 30, 32, 34 may be at least partially defined by other components of the engine 10.

Figure 4:
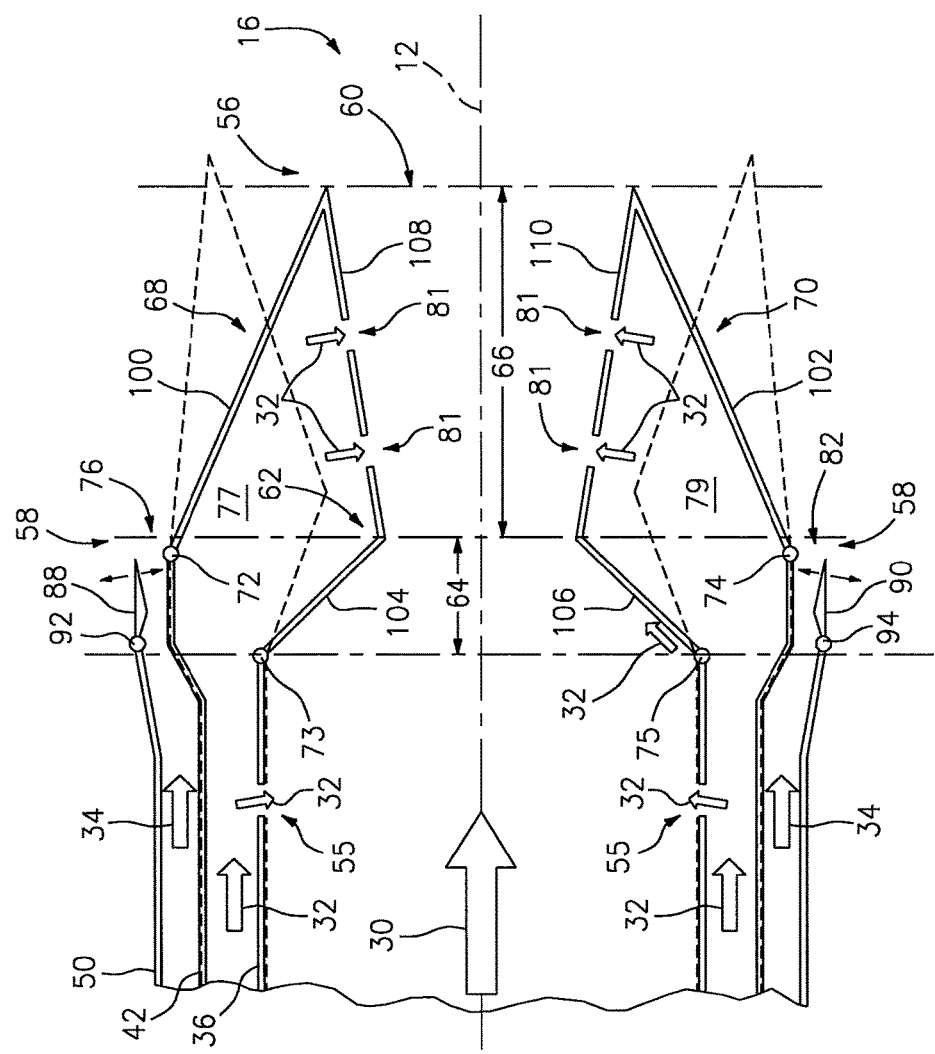
FIG. 4 is a sectional side illustration of the exhaust section of the turbofan engine of FIG. 1.
Figure 7:
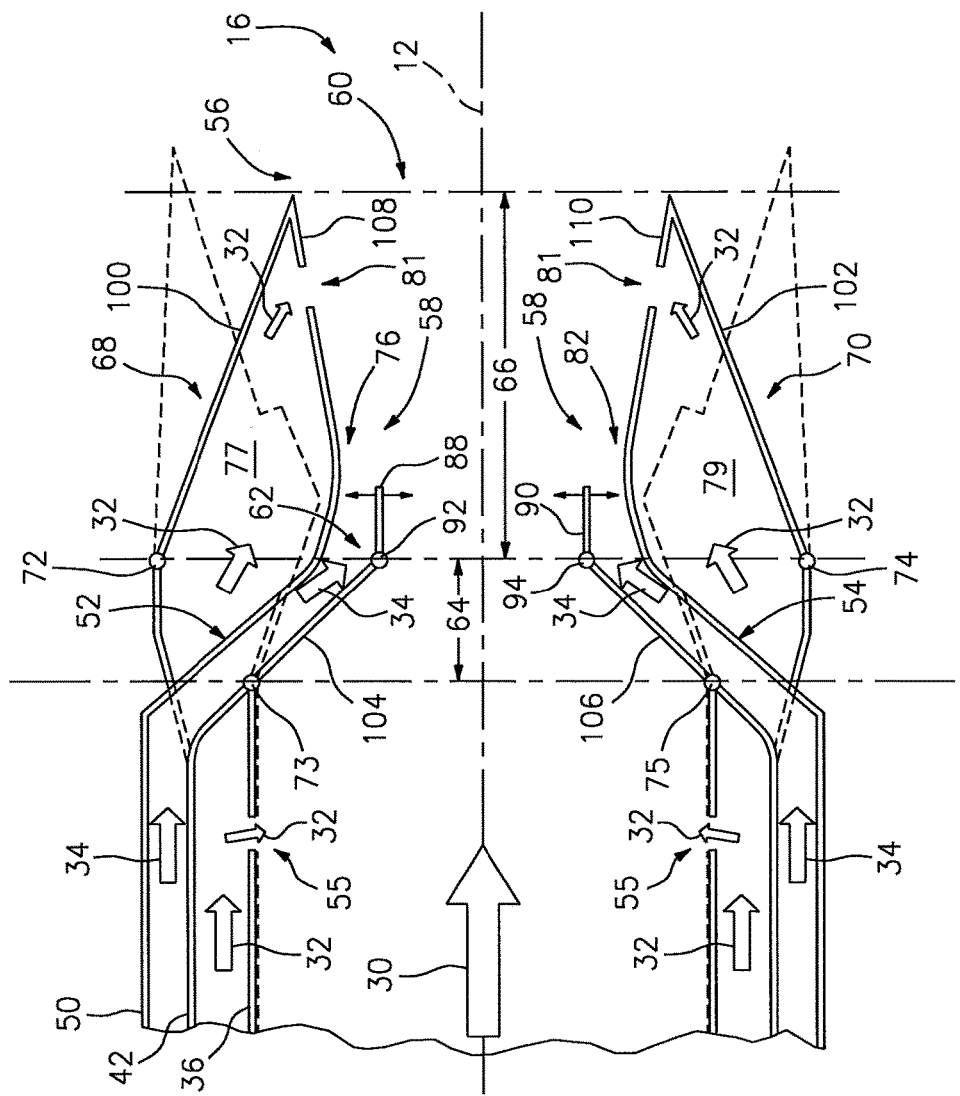
FIG. 7 is a sectional side illustration of the exhaust section of the turbofan engine of FIG. 6.

Referring to FIGS. 4 and 7, the exhaust section 16 of the engine 10 includes a primary exhaust nozzle 56 and a third flowpath exhaust nozzle 58.

The primary exhaust nozzle 56 defines a primary exhaust exit port 60 through which gas traveling along the first flowpath 30 and the second flowpath 32 may be discharged. In some embodiments, including the embodiment illustrated in FIG. 7, gas traveling along the third flowpath 34 may also discharge through the primary exhaust exit port 60. The primary exhaust nozzle 56 may include a plurality of flap assemblies 68, 70. In the embodiments illustrated in FIGS. 4 and 7, the primary exhaust nozzle 56 includes a plurality of flap assemblies 68, 70, each pivotably mounted to the first and second engine cases 36, 42. Each flap assembly 68, 70 includes an external flap 100, 102 connected to the second engine case 42 at a hinge 72, 74; a convergent flap 104, 106 connected to the first engine case 36 at a hinge 73, 75; and a divergent flap 108, 110 that extends between the external flap 100, 102 and the convergent flap 104, 106. Seals (not shown) are disposed between neighboring flap assemblies 68, 70, and between the components of the flap assemblies 68, 78, to reduce or eliminate flow loss therebetween. The flap assemblies 68, 70 each form a cavity 77, 79 through which gas traveling along the second flowpath 32 may pass. The flap assemblies 68, 70 also each include a plurality of apertures 81 that permit gas traveling along the second flowpath 32 to be discharged through the primary exhaust exit port 60. In the embodiments in FIGS. 4 and 7, the apertures 81 are disposed in the divergent flaps 108, 110 of the flap assemblies 68, 70. In other embodiments, the apertures 81 may additionally or alternatively be disposed in the convergent flaps 104, 106 of the flap assemblies 68, 70. The convergent flaps 104, 106 form a convergent section 64 of the primary exhaust nozzle 56, and the divergent flaps 108, 110 form a divergent section 66 of the primary exhaust nozzle 56. The convergent flaps 104, 106 and the divergent flaps 108, 110 also form a throat section 62 of the primary exhaust nozzle 56. The throat section 62 is between the convergent section 64 and the divergent section 66 of the primary exhaust nozzle 56. The primary exhaust nozzle 56 may be configured so that a characteristic (e.g., an area, a geometry, etc.) of the primary exhaust exit port 60 is selectively adjustable. In FIGS. 4 and 7, for example, the flap assemblies 68, 70 may be independently and selectively pivoted (e.g., by an associated actuator system and controller) between a first position (shown in solid lines) and a second position (shown in broken lines) to selectively adjust the area of the primary exhaust exit port 60. By selectively adjusting a characteristic of the primary exhaust exit port 60, a characteristic (e.g., a pressure, a flow rate, a direction, a velocity, etc.) of gas passing there through may be selectively adjusted.

The third flowpath exhaust nozzle 58 defines a plurality of third flowpath exhaust exit ports 76, 78, 80, 82, 84, 86 (see, e.g., FIGS. 5 and 8) through which gas traveling along the third flowpath 34 may be discharged. In some embodiments, the third flowpath exhaust nozzle 58 is positioned on the engine 10 so that gas discharged through the third flowpath exhaust exit ports 76, 78, 80, 82, 84, 86 subsequently discharges through the primary exhaust exit port 60. In the embodiment illustrated in FIG. 7, for example, the third flowpath exhaust nozzle 58 is radially inboard and upstream of the primary exhaust nozzle 56, and thus gas discharged through the third flowpath exhaust exit ports 76, 78, 80, 82, 84, 86 subsequently discharges through the primary exhaust exit port 60. As shown for example in FIGS. 4 and 7, in some embodiments the third flowpath exhaust nozzle 58 may be positioned on the engine 10 so that the third flowpath exhaust exit ports 76, 78, 80, 82, 84, 86 are located downstream of the throat section 62 of the primary exhaust nozzle 56. In other embodiments, the third flowpath exhaust nozzle 58 may be positioned on the engine 10 so that the third flowpath exhaust exit ports 76, 78, 80, 82, 84, 86 are located upstream of the throat section 62. The third flowpath exhaust nozzle 58 may be structurally similar to the primary exhaust nozzle 56. In the embodiment illustrated in FIG. 4, the third flowpath exhaust nozzle 58 includes a plurality of flaps 88, 90, each pivotably mounted to the third engine case 50 at a hinge 92, 94. In the embodiment illustrated in FIG. 7, the third flowpath exhaust nozzle 58 includes a plurality of flaps 88, 90, each pivotably mounted to an engine duct 52, 54 at a hinge 92, 94. In the embodiments illustrated in FIGS. 4 and 7, the third flowpath exhaust nozzle 58 defines six (6) circumferentially-spaced flowpath exhaust exit ports 76, 78, 80, 82, 84, 86 (see FIGS. 5 and 8). In other embodiments, the third flowpath exhaust nozzle 58 may define less than or greater than six (6) flowpath exhaust exit ports 76, 78, 80, 82, 84, 86.

The third flowpath exhaust nozzle 58 is configured so that a characteristic (e.g., an area, a geometry, etc.) of each of the third flowpath exhaust exit ports 76, 78, 80, 82, 84, 86 is independently and selectively adjustable. Referring to FIGS. 4 and 7, for example, the positioning of the flaps 88, 90 may be independently and selectively adjusted (e.g., by an associated actuator system and controller) to independently and selectively adjust the area of the respective third flowpath exhaust exit ports 76, 82. By adjusting a characteristic of the third flowpath exhaust exit ports 76, 78, 80, 82, 84, 86, a characteristic (e.g., a pressure, a flow rate, a direction, a velocity, etc.) of gas passing there through may be selectively adjusted. The flaps 88, 90 of the third flowpath exhaust nozzle 58 may be positioned so that they are convergent, divergent, or generally parallel to the centerline 12 of the engine 10 (see, e.g., FIGS. 4 and 7).

Referring to FIGS. 1, 2, 6 and 7, during operation of the engine 10, gas entering the inlet section 14 of the engine 10 is divided between the first flowpath 30, the second flowpath 32, and the third flowpath 34. The gas travels axially through the engine 10 along the flowpaths 30, 32, 34 until it is discharged through the exhaust section 16 of the engine 10 (e.g., through the primary exhaust nozzle 56 and/or the third flowpath exhaust nozzle 58). Gas traveling along the second and third flowpaths 32, 34 may not include products of combustion seen in the first flowpath 30, and thus the gas traveling along the second and third flowpaths 32, 34 may be significantly cooler than gas traveling along the first flowpath 30. For example, gas traveling along the second and third flowpaths 32, 34 may have a temperature within the range of approximately one hundred seventy-five (175) degrees Celsius (i.e., approximately three hundred fifty (350) degrees Fahrenheit) and approximately four hundred twenty-five (425) degrees Celsius (i.e., approximately eight hundred (800) degrees Fahrenheit), whereas gas traveling along the first flowpath 30 may have a temperature that is greater than approximately seven hundred sixty (760) degrees Celsius (i.e., approximately fourteen hundred (1400) degrees Fahrenheit).

Figure 5:
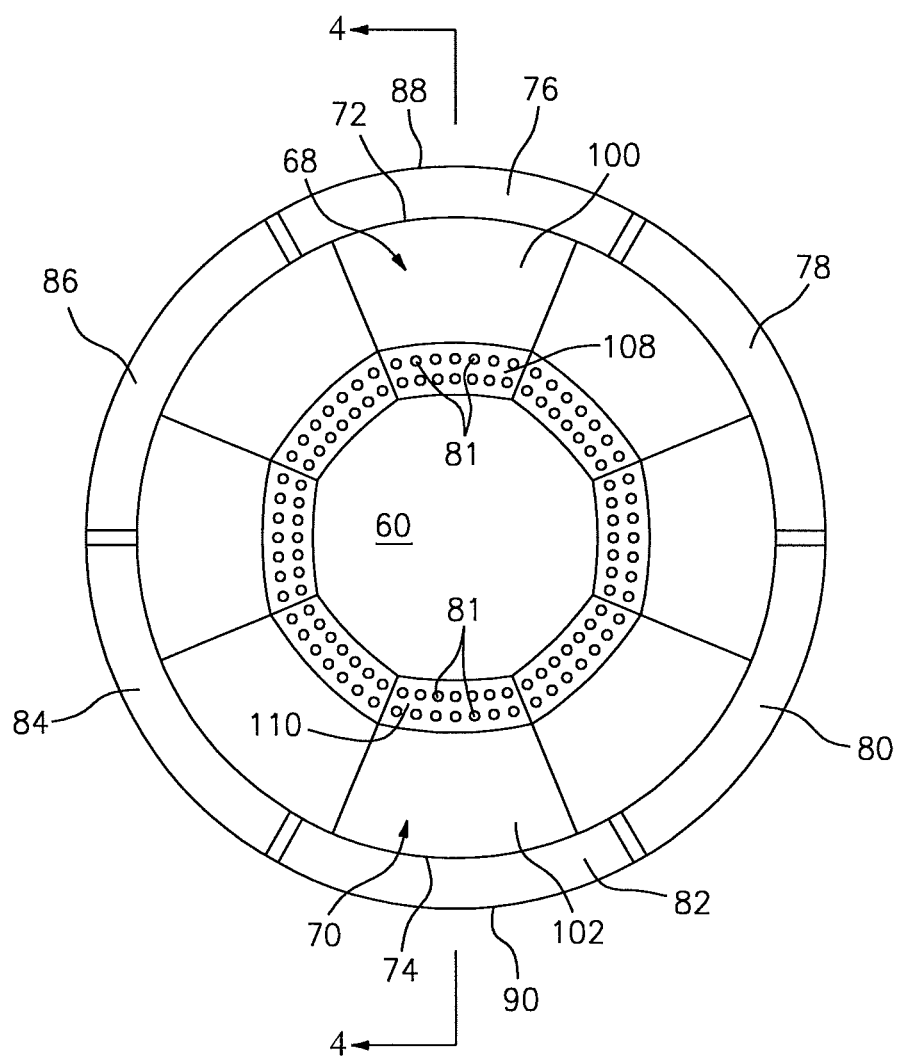
FIG. 5 is an end illustration of the exhaust section of the turbofan engine of FIG. 1.
Figure 8:
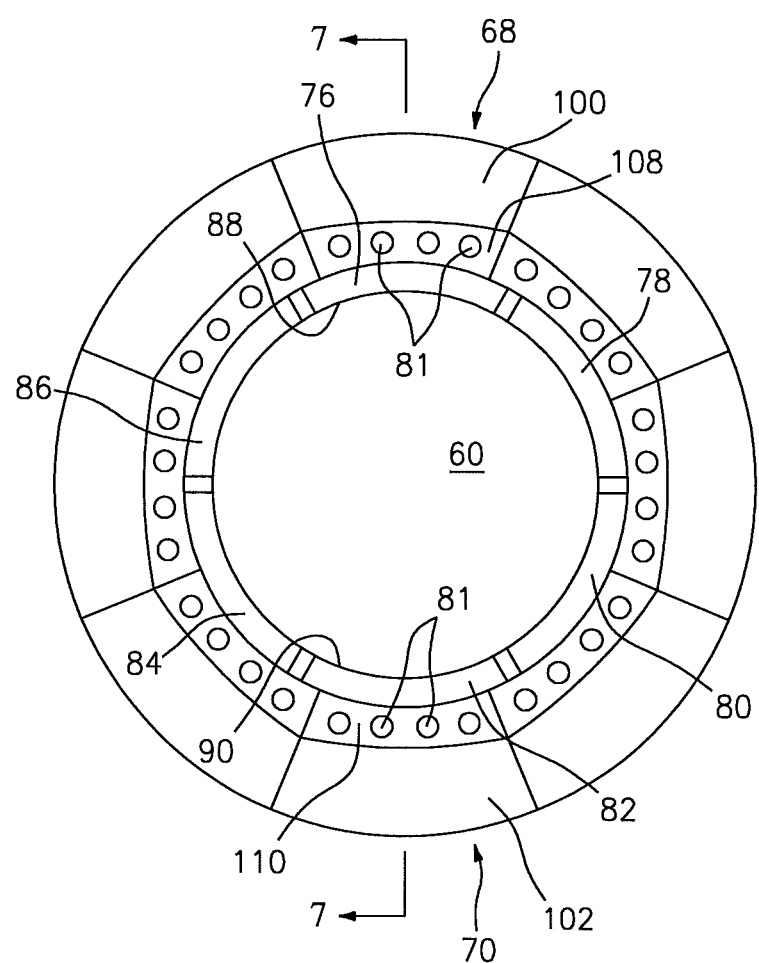
FIG. 8 is an end illustration of the exhaust section of the turbofan engine of FIG. 6.

Referring to FIGS. 5 and 8, during operation of the engine 10, a characteristic (e.g., an area, a geometry, etc.) of one or more of the third flowpath exhaust exit ports 76, 78, 80, 82, 84, 86 may be independently and selectively adjusted to achieve a desired engine operation or function. The desired engine operation may be pitch thrust vectoring. Pitch thrust vectoring may be achieved, for example, by increasing the area of the third flowpath exhaust exit ports 76, 78, 86 proximate the top of the engine 10, while simultaneously reducing the area of the third flowpath exhaust exit ports 80, 82, 84 proximate the bottom of the engine 10. The desired engine operation may be yaw thrust vectoring. Yaw thrust vectoring may be achieved, for example, by increasing the area of the third flowpath exhaust exit ports 84, 86 proximate the port side the engine 10, while simultaneously reducing the area of the third flowpath exhaust exit ports 78, 80 proximate the starboard side of the engine 10. The desired engine operation may be noise reduction; e.g., it may be desirable to reduce the actual or perceived noise generated by the engine 10. Noise reduction may be achieved, for example, by increasing the area of the third flowpath exhaust exit ports 78, 80, 84, 86 proximate the sides of the engine 10, while simultaneously reducing the area of the third flowpath exhaust exit ports 76, 82 proximate the top and bottom of the engine 10. The desired engine operation may be enhanced plume mixing; e.g., it may be desirable to increase the extent to which gas discharged through the third flowpath exhaust exit ports 76, 78, 80, 82, 84, 86 mixes with gas passing along the first flowpath 30 and the second flowpath 32. Enhanced plume mixing may be achieved, for example, by increasing the area of alternating third flowpath exhaust exit ports 76, 78, 80, 82, 84, 86; e.g., by increasing the area of the third flowpath exhaust exit ports 76, 80, 84 relative to the third flowpath exhaust exit ports 78, 82, 84. The desired engine operation may be aircraft drag reduction; e.g., it may be desirable to reduce drag experienced by the aircraft on which the engine 10 is mounted. Aircraft drag reduction may be achieved, for example, by adjusting the third flowpath exhaust exit ports 76, 78, 80, 82, 84, 86 so that gas discharged therefrom is asymmetric. The gas discharged from the third flowpath exhaust exit ports 76, 78, 80, 82, 84, 86 may be asymmetric, for example, if the area of the third flowpath exhaust exit port 76 proximate the top of the engine 10 is increased relative to the other third flowpath exhaust exit ports 78, 80, 82, 84, 86. The desired engine operation may be thermal protection of aircraft structure; e.g., it may be desirable to thermally protect (e.g., reduce heating of) a structure of the aircraft on which the engine 10 is mounted. In one example in which a structure of the aircraft (e.g., a portion of the fuselage) is proximate the starboard side of the engine 10, thermal protection of that structure of the aircraft may be achieved, for example, by reducing the area of the third flowpath exhaust exit ports 78, 80 proximate the starboard side of the engine 10. The desired engine operation is not limited to the examples described herein.

In one embodiment of the turbofan engine, by independently and selectively adjusting an area or a geometry of one of the plurality of third flowpath exhaust exit ports, a characteristic of gas passing there through may be independently and selectively adjusted. In another embodiment of the turbofan engine, the turbofan engine includes a primary exhaust nozzle that defines a primary exhaust exit port through which gas traveling along the first flowpath and the second flowpath may be discharged. In another embodiment of the turbofan engine, the third flowpath exhaust nozzle is positioned on the turbofan engine so that gas discharged through the plurality of third flowpath exhaust exit ports subsequently discharges through the primary exhaust exit port. In another embodiment of the turbofan engine, at a location downstream of a core section of the turbofan engine, the third flowpath is radially inboard of the second flowpath. In another embodiment of the turbofan engine, the first flowpath, the second flowpath, and the third flowpath extend generally axially in a direction between an inlet section of the turbofan engine and an exhaust section of the turbofan engine. In another embodiment of the turbofan engine, the turbofan engine includes an engine case that at least partially defines the first flowpath, the second flowpath, or the third flowpath. In another embodiment of the turbofan engine, the turbofan engine includes an engine duct that at least partially defines the first flowpath, the second flowpath, or the third flowpath. In another embodiment of the turbofan engine, the gas traveling along the third flowpath has a temperature that is significantly lower than a temperature of the gas traveling along the first flowpath. In one embodiment of the exhaust section of the turbofan engine, the third flowpath is radially outboard of a second flowpath at a location upstream of a core section of the turbofan engine, and the second flowpath is radially outboard of a first flowpath at the location upstream of the core section of the turbofan engine. In another embodiment of the exhaust section, the exhaust section includes a primary exhaust nozzle that defines a primary exhaust exit port through which gas traveling along the first flowpath and the second flowpath may be discharged. In another embodiment of the exhaust section, the third flowpath exhaust nozzle is positioned on the turbofan engine so that gas discharged through the plurality of third flowpath exhaust exit ports subsequently discharges through the primary exhaust exit port. In another embodiment of the exhaust section, at a location downstream of a core section of the turbofan engine, the third flowpath is radially inboard of the second flowpath. In another embodiment of the exhaust section, the first flowpath, the second flowpath, and the third flowpath extend generally axially in a direction between an inlet section of the turbofan engine and the exhaust section of the turbofan engine. In another embodiment of the exhaust section, the exhaust section includes an engine case that at least partially defines the first flowpath, the second flowpath, or the third flowpath. In another embodiment of the exhaust section, the exhaust section includes an engine duct that at least partially defines the first flowpath, the second flowpath, or the third flowpath. In another embodiment of the exhaust section, by independently and selectively adjusting an area or a geometry of one of the plurality of third flowpath exhaust exit ports, a characteristic of gas passing there through may be independently and selectively adjusted. In one method for operating the turbofan engine, the desired engine operation is selected from the group that includes: thrust vectoring, noise reduction, enhanced plume mixing, aircraft drag reduction, and thermal protection of aircraft structure.

While various embodiments have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A turbofan engine, comprising:
   a first flowpath that is radially inboard of a second flowpath at a location upstream of a core section of the turbofan engine;
   a third flowpath that is radially outboard of the second flowpath at the location upstream of the core section of the turbofan engine;
   a third flowpath exhaust nozzle that defines a plurality of third flowpath exhaust exit ports through which gas traveling along the third flowpath may be discharged; and
   a primary exhaust nozzle that defines a primary exhaust exit port through which a first gas flow travelling along the first flowpath and a second gas flow traveling along the second flowpath may be discharged;
   wherein the third flowpath exhaust nozzle is configured so that an area of each of the plurality of third flowpath exhaust exit ports is independently and selectively adjustable;
   wherein the third flowpath exhaust nozzle is positioned on the turbofan engine so that the gas discharged through the plurality of third flowpath exhaust exit ports subsequently discharges through the primary exhaust exit port; and
   wherein, at a location downstream of the core section of the turbofan engine, the third flowpath is radially inboard of the second flowpath.

2. The turbofan engine of claim 1, wherein by independently and selectively adjusting an area of one of the plurality of third flowpath exhaust exit ports, a characteristic of the gas passing there through may be independently and selectively adjusted.

3. The turbofan engine of claim 1, wherein the first flowpath, the second flowpath, and the third flowpath extend generally axially in a direction between an inlet section of the turbofan engine and an exhaust section of the turbofan engine.

4. The turbofan engine of claim 1, further comprising an engine case that at least partially defines the first flowpath, the second flowpath, or the third flowpath.

5. The turbofan engine of claim 1, further comprising an engine duct that at least partially defines the first flowpath, the second flowpath, or the third flowpath.

6. The turbofan engine of claim 1, wherein the gas traveling along the third flowpath has a temperature that is lower than a temperature of the first gas flow traveling along the first flowpath.

7. An exhaust section of a turbofan engine, comprising:
   a first flowpath;
   a second flowpath radially outboard of the first flowpath; and
   a third flowpath exhaust nozzle that defines a plurality of third flowpath exhaust exit ports through which gas traveling along a third flowpath of the turbofan engine may be discharged, the third flowpath exhaust nozzle radially outboard of the second flowpath; and
   a primary exhaust nozzle that defines a primary exhaust exit port through which a first gas flow traveling along the first flowpath and a second gas flow traveling along the second flowpath may be discharged;
   wherein the third flowpath exhaust nozzle is configured so that an area or a geometry of each of the plurality of third flowpath exhaust exit ports is independently and selectively adjustable;
   wherein the third flowpath exhaust nozzle is positioned on the turbofan engine so that the gas discharged through the plurality of third flowpath exhaust exit ports subsequently discharges through the primary exhaust exit port; and
   wherein, at a location downstream of a core section of the turbofan engine, the third flowpath is radially inboard of the second flowpath.

8. The exhaust section of claim 7, wherein the third flowpath is radially outboard of the second flowpath at a location upstream of the core section of the turbofan engine, and wherein the second flowpath is radially outboard of the first flowpath at the location upstream of the core section of the turbofan engine.

9. The exhaust section of claim 8, wherein the first flowpath, the second flowpath, and the third flowpath extend generally axially in a direction between an inlet section of the turbofan engine and the exhaust section of the turbofan engine.

10. The exhaust section of claim 8, further comprising an engine case that at least partially defines the first flowpath, the second flowpath, or the third flowpath.

11. The exhaust section of claim 8, further comprising an engine duct that at least partially defines the first flowpath, the second flowpath, or the third flowpath.

12. The exhaust section of claim 7, wherein by independently and selectively adjusting the area or the geometry of one of the plurality of third flowpath exhaust exit ports, a characteristic of the gas passing there through may be independently and selectively adjusted.

13. A method for operating a turbofan engine having a third flowpath exhaust nozzle that defines a plurality of third flowpath exhaust exit ports through which gas traveling along a third flowpath of the turbofan engine may be discharged, the third flowpath exhaust nozzle being configured so that an area or a geometry of each of the plurality of third flowpath exhaust exit ports is independently and selectively adjustable, the method comprising:

independently and selectively adjusting an area of at least one of the plurality of third flowpath exhaust exit ports to achieve an engine operation;

wherein a first flowpath is radially inboard of a second flowpath at a location;

wherein the third flowpath is radially outboard of the second flowpath at the location;

wherein a primary exhaust nozzle defines a primary exhaust exit port through which a first gas flow traveling along the first flowpath and a second gas flow traveling along the second flowpath is discharged;

wherein the third flowpath exhaust nozzle is positioned on the turbofan engine so that the gas discharged through the plurality of third flowpath exhaust exit ports subsequently discharges through the primary exhaust exit port; and wherein, at a location downstream of a core section of the turbofan engine, the third flowpath is radially inboard of the second flowpath.

14. The method of claim 13, wherein the engine operation is selected from the group that includes: thrust vectoring, noise reduction, enhanced plume mixing, aircraft drag reduction, and thermal protection of aircraft structure.

* * * * *